Patented Apr. 28, 1942

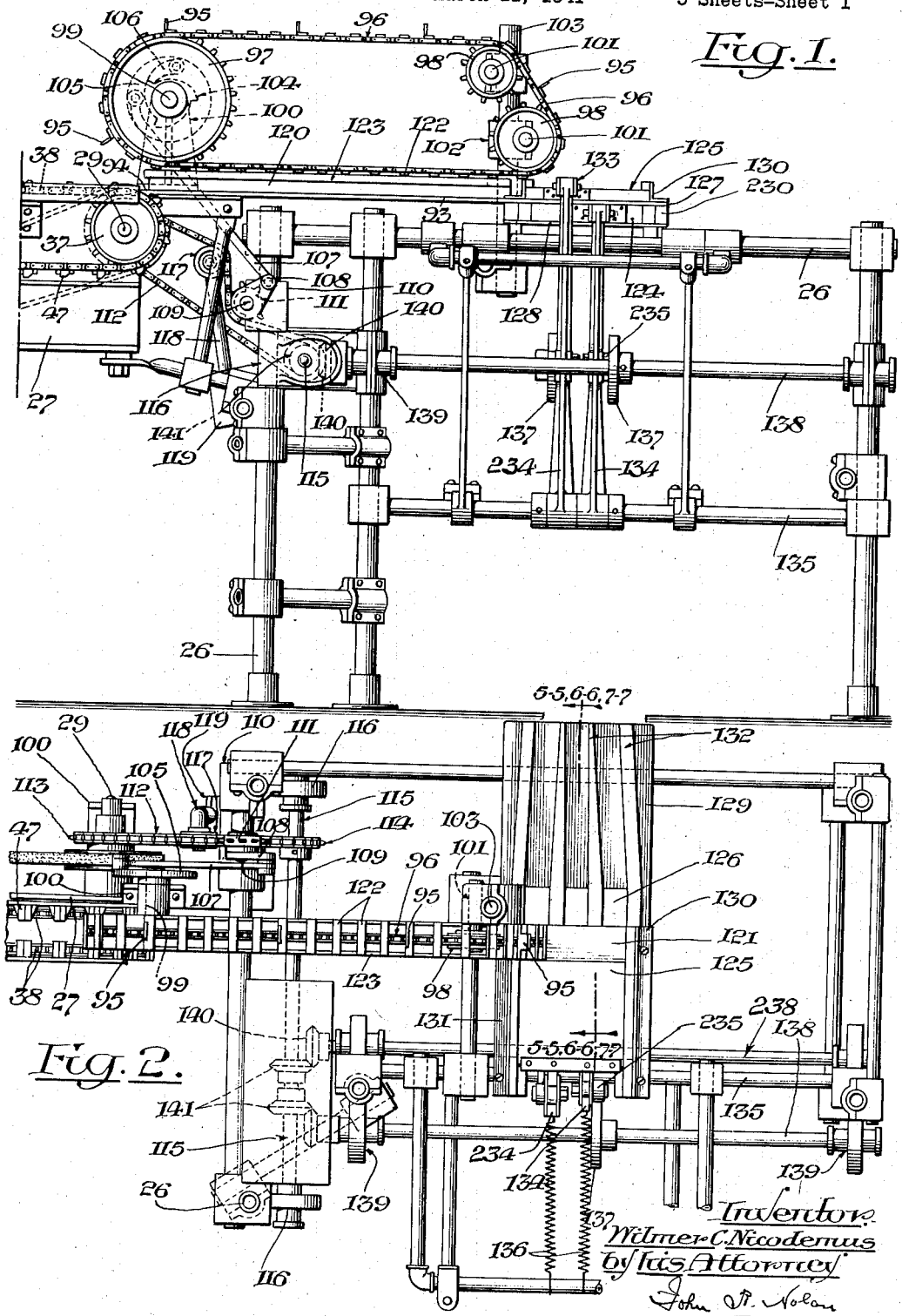

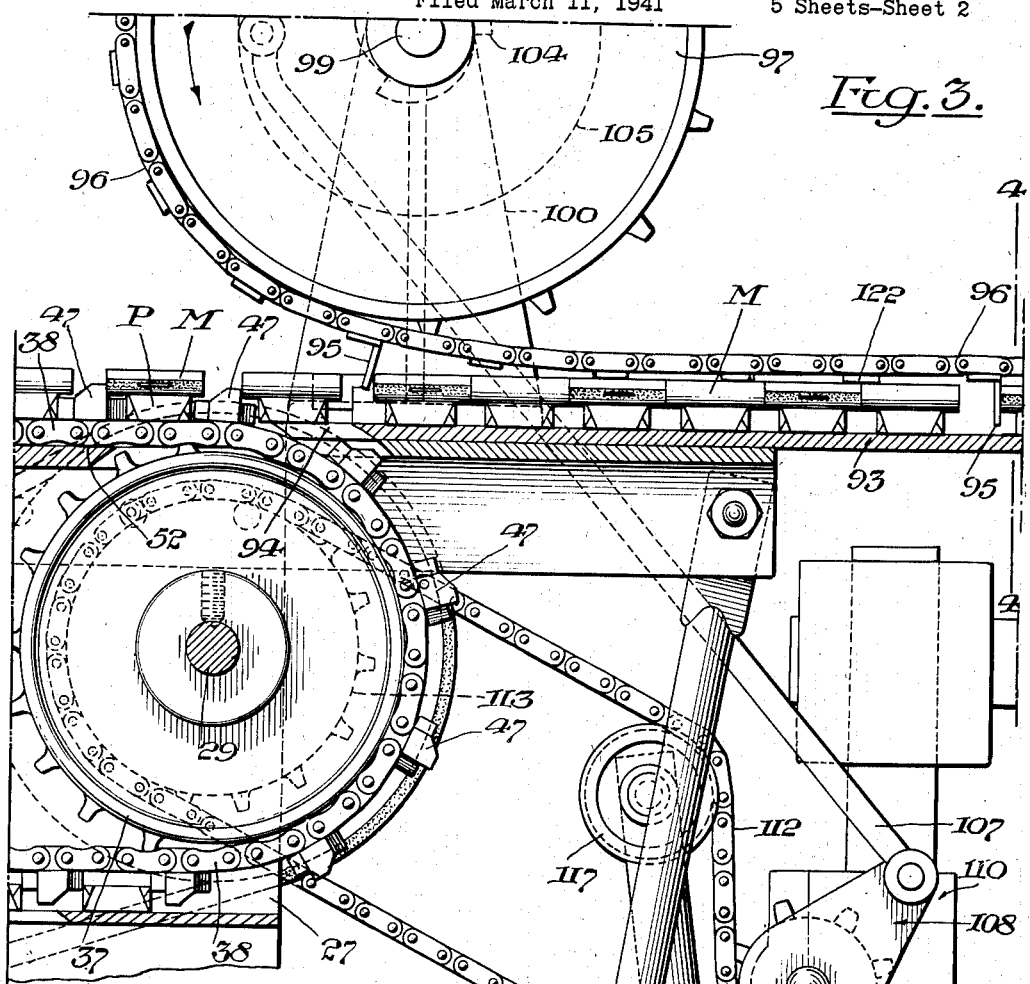
Fig. 3.
Fig. 4.
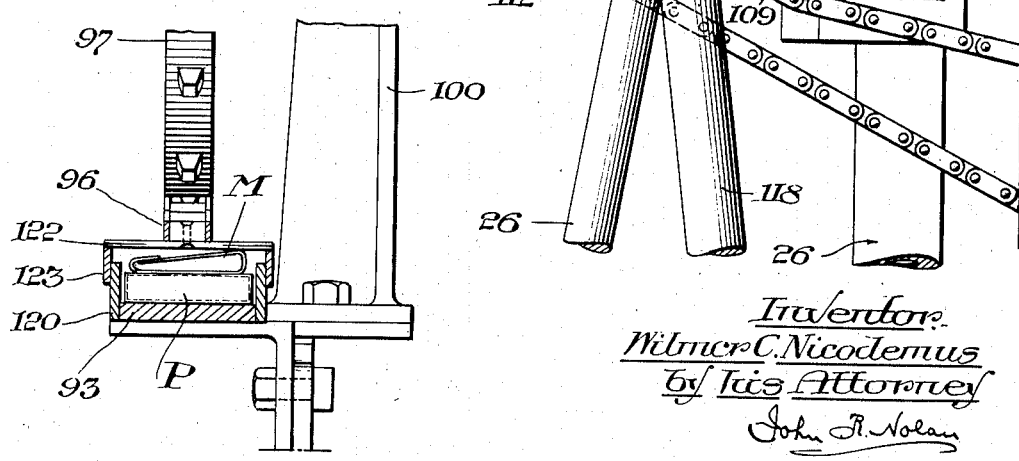
Inventor:
Wilmer C. Nicodemus
by his Attorney
John R. Nolan

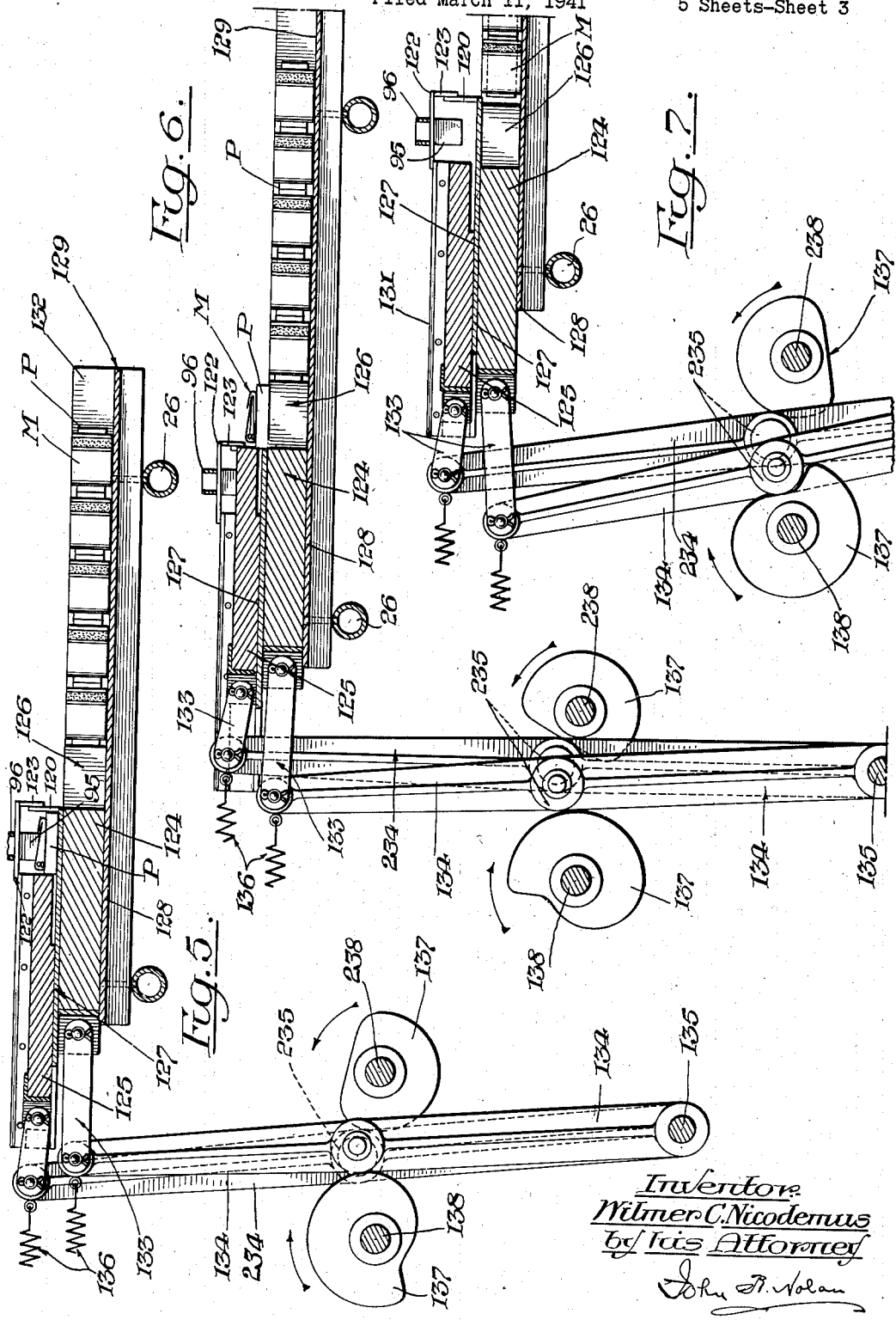

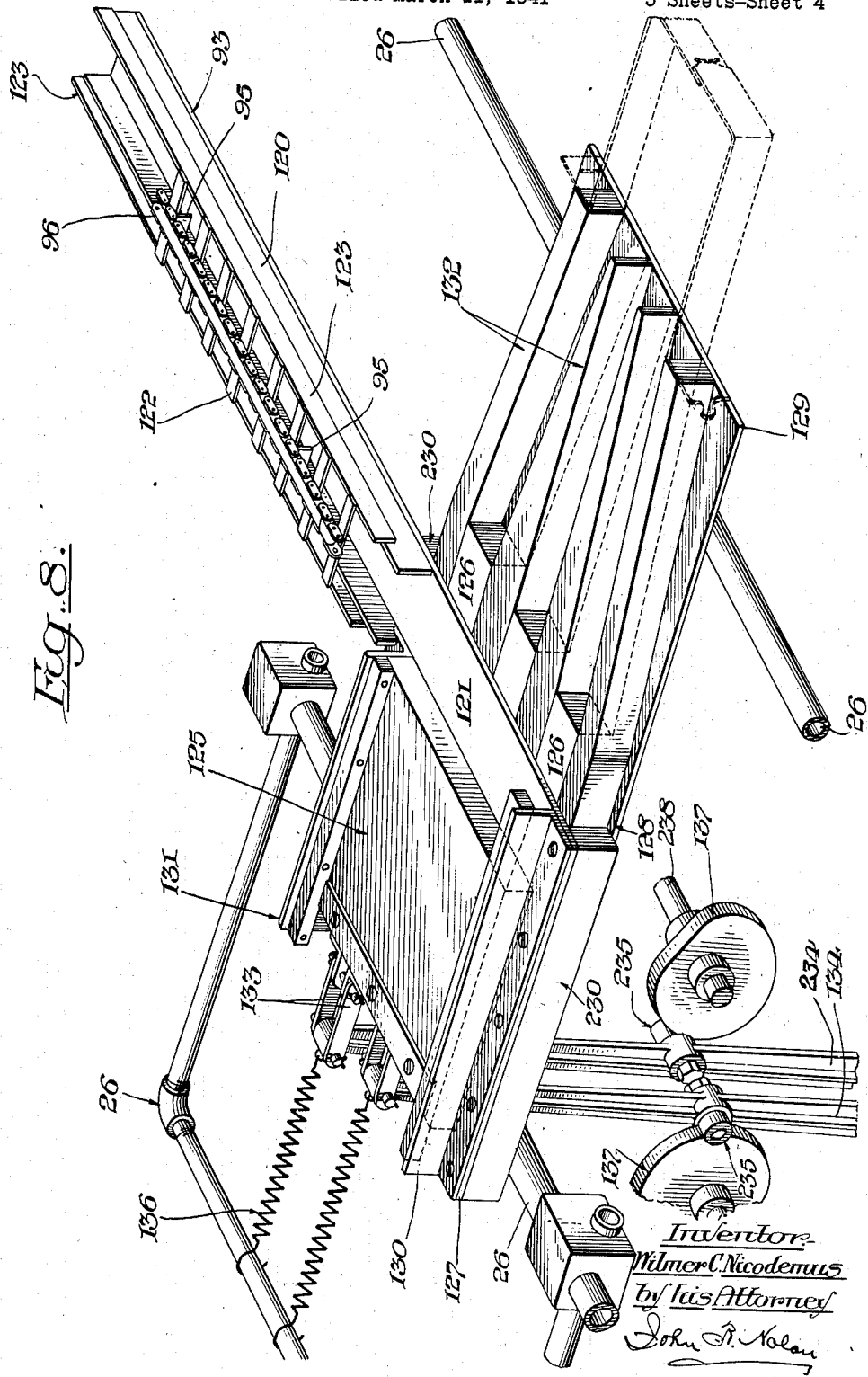

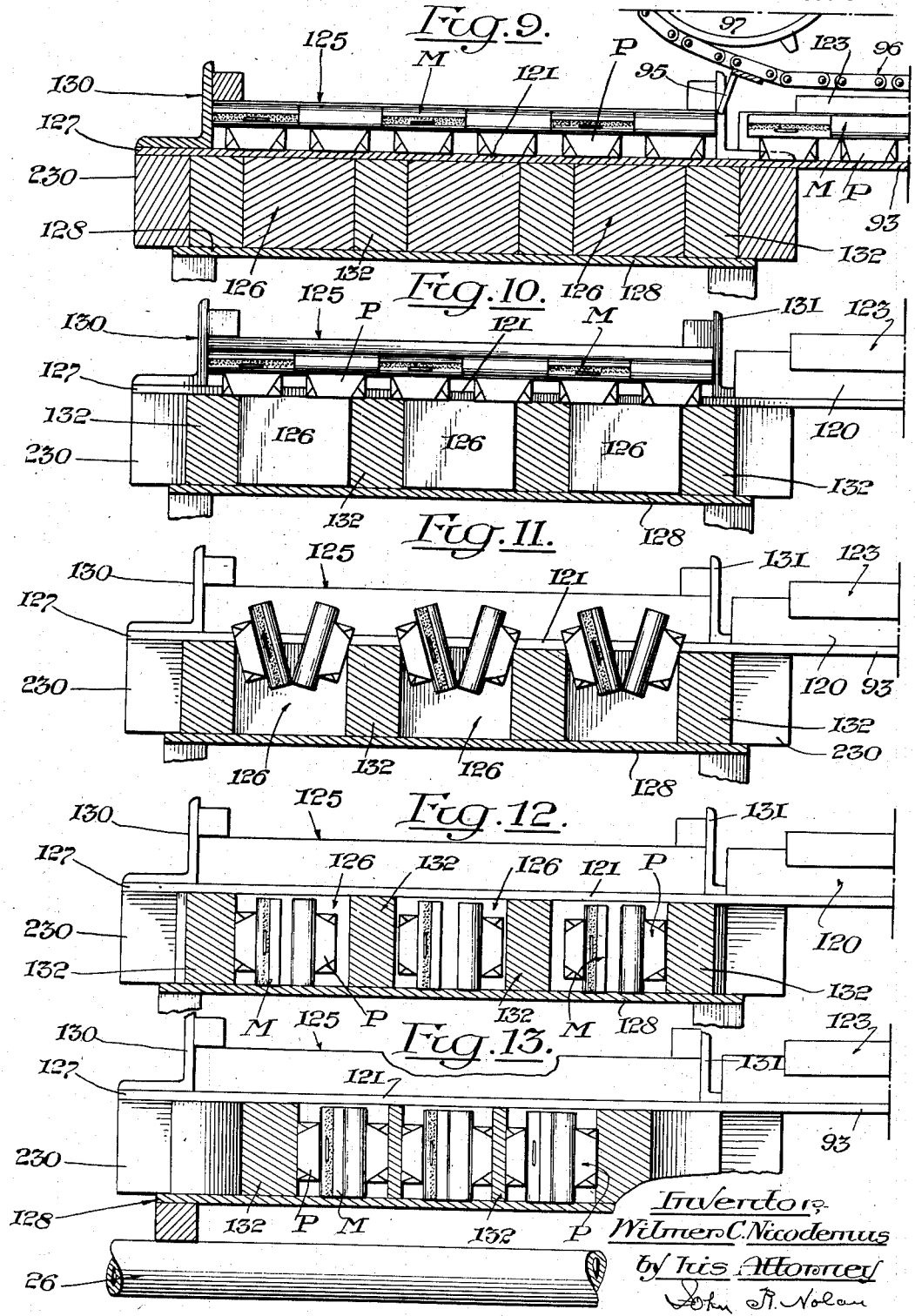

2,281,006

UNITED STATES PATENT OFFICE 2,281,006

GROUPING AND ARRANGING MECHANISM FOR PACKET ASSEMBLING MACHINES

Wilmer C. Nicodemus, Barberton, Ohio, assignor to The Diamond Match Company, New York, N. Y., a corporation of Delaware Application March 11, 1941, Serial No. 382,721

2 Claims. (Cl. 198—33)

The object of this invention is to provide mechanism of simple and efficient construction and operation, for selecting groups of articles as they are delivered by an assembling machine and for arranging the successive groups in compact rows for convenience of packing in suitable containers. The mechanism is designed more especially for use in connection with the conveyer of a machine for combining dissimilar articles, such, for example, as an advertising match packet and another packet containing a sample or samples of the advertised product.

My invention comprises features of construction and combinations of parts which, in the form illustrated, will be hereinafter described, the scope of the invention being expressed in the appended claims.

In the drawings—

Figure 1 is a front elevation of my improved selecting and arranging mechanism at the delivery end of a packet assembling machine, only so much of the latter being shown as is necessary to illustrate the invention.

Fig. 2 is a plan of said mechanism.

Fig. 3 is a longitudinal vertical section in a plane adjacent the drive sprockets of the assembling machine, showing the feed chain for advancing the packages row by row from the conveyer of the assembling machine and along the supporting bed.

Fig. 4 is a transverse vertical section in a plane through said bed, as on the line 4—4 of Fig. 3.

Figs. 5, 6 and 7 are vertical sections through the table at the delivery end of the bed, as on the lines 5—5, 6—6 and 7—7, respectively, of Fig. 2, showing the package arranging devices including their co-operating plungers for acting upon each succeeding row of packages presented thereto by the feed chain and positioning the row on the table, said plungers being shown in their successive relative positions.

Fig. 8 is a general perspective view of the package arranging mechanism, including a portion of the feed chain and the table.

Figs. 9 to 13, inclusive, are vertical sections through a channeled base structure into which the packages of each row are transferred from the table and thereby arranged vertically face to face, the dual packages of a row being represented in the successive positions that they are caused to assume by the movements of the plungers in relation to the channels of said structure.

Referring to the drawings, 26 designates a skeleton supporting frame adjacent the delivery portion of the conveyer 36 of the packet assembling machine, which conveyer has thereon a succession of blocks 47 constituting holders for dual packets. Each packet consists of, say, a conventional match book (M) imposed on a sample packet (P) of another product.

The delivery portion of the conveyer is trained about sprocket wheels 37 fast on a shaft 29 which is driven from a suitable source of power. As each succeeding dual package passes across the top of the sprocket wheel 37 the package advances upon an elongated bed 93 in the same horizontal plane, or substantially so, as the bottoms of the combined packets, the adjacent end portion 94 of the bed thus serving as a stripper to remove the package from the conveyer. When a determined number of packages, say six, have been moved, side by side along the bed, the trailing package of the row is in the descending path of one of the spaced angular lugs 95 of an intermittently movable feed chain 96, which lug in its travel impels the row of packages along the bed 93 with the hooks in close lateral contact, as seen in Fig. 3. A succession of two or more spaced rows of packages are caused to progress along the bed by the action of the successive lugs on the respective rows, and as the leading row reaches the end of the bed the contiguous lug is raised above the path of the packages, thus releasing the leading row. (See Fig. 9.) As shown the chain 96 is trained about suitable sprocket wheels 97 and 98 at the respective ends of the bed 93. The single wheel 97 is fast on a transverse shaft 99 having its bearings in an upstanding bracket 100 located at the receiving end of the bed, and the two smaller wheels 98, arranged one above the other, are located at the delivery end of the bed, the latter wheels being loose on stud shafts 101 fixed in clamp brackets 102 mounted on a post 103 rising from the main frame. The wheel 97 and the lower wheel 98 are so mounted in relation to the bed that the lower run of the chain sags somewhat in order to permit each succeeding lug as it passes downward at the wheel 97 to move into engaging relation with the opposing packet, and then to cause the lug to rise above the packet as the chain passes to and around the lower wheel 98.

The shaft 99 of the wheel 97 is actuated by suitable means to advance the feed chain intermittently, each step as well as the spacing of the lugs 95 being slightly greater in length than that of the determined row of packages. The means herein illustrated for this purpose comprises a ratchet wheel 104 and a crank disc 105 respectively fast and loose on the shaft 99. The disc, which carries a pivoted pawl 106 in co-operating relation to the ratchet wheel, is pivotally connected by a rod 107 with a crank 108 on a lower transverse shaft 109 having its bearings 110 attached to the adjacent standards of the supporting frame. Hence when the shaft 109 is continuously driven intermittent motion is transmitted through the agency of the pawl and ratchet connections to the shaft 99 and its sprocket wheel 97, thus actuating the feed chain 96, as mentioned.

In the present instance the shaft 109 has fast thereon a sprocket wheel 111 in mesh with one of the runs of a chain 112 which is trained about a sprocket wheel 113 on the main shaft 29 and also about a sprocket wheel 114 fast on a shaft 115 journaled in bearings 116 supported by the main frame below and laterally of the crank shaft 109. The upper run of the chain 112 is held in mesh with the sprocket wheel 111 by means of a guide roll 117 suitably mounted on the upper end of an arm 118 which is pivotally supported in a clamp member 119 on the main frame. By proper manipulation of the clamp member the arm 118 with its roll 117 can be readily released, adjusted in efficient relation to the chain and clamped in place. (See Figs. 1 and 3.)

The feed chain advances each succeeding row of dual packages from the receiving to the delivery end of the bed, which bed 93 is provided with side walls 120 by and between which the packages are guided in their travel. The walls terminate short of the bed, thus providing a table 121 to which the row of packages is delivered. The chain 96, which runs medially of the bed, is equipped at intervals with spaced cross-strips 122 which ride on parallel rails 123 on the side walls of the bed. Thereby the sagging of the lower run of the feed chain upon the covers of the match books of the underlying packages is prevented, thus obviating the otherwise liability of marring the surfaces of the covers. (See Figs. 3, 4 and 8.)

Supported at the delivery end of the feed bed 93 is mechanism of simple and efficient construction to the action of which each succeeding row of dual packages is presented, and the packages are arranged vertically and in face to face relation for convenience of packing in conventional cartons.

The package arranging mechanism in the form illustrated comprises two flat plungers 124 and 125, one above the other, mounted for independent horizontal reciprocation in parallel paths at right angles to the row of packages on the table 121.

The lower plunger 124 is slotted at its rearward end to afford a series of equally spaced comblike projections 126 and it is also slidably mounted between a forward extension 127 of the table 121 and a base plate 128 which is supported upon the frame structure and extends some distance rearwardly of the table, as at 129. The table and its extension are fastened to side bars 230 at the respective sides of the base plate. (See Fig. 8.) The upper plunger 125 rests upon the extension 127 of the table 121 and is slidably fitted in angular side guides 130 and 131, the latter guide terminating short of the rear edge of the table, so as to permit the passage of the packages to and upon the table, and the guide 130 extending across the table to afford a stop for the leading package thereon. The extension 129 of the base plate is provided throughout the length of its upper face with a series of equally spaced partitions 132 arranged to afford a series of channels converging toward the rear of the extension, as seen in Figs. 2 and 8. The channels are of equal width corresponding in number and relation with the plunger projection 126, it being noted that the width of each channel somewhat exceeds the combined thickness of two dual packages disposed face to face, as best seen in Figs. 9 and 12.

The rearward ends of the respective plungers 124 and 125 are pivotally connected by means of links 133 to the upper ends of two vertical rock levers 134 and 234 which are loosely mounted at their lower ends on a stationary shaft 135 supported by the main frame. Each lever is equipped intermediate its ends with a lateral roll 235 which, by means of a suitable spring 136 secured at its respective ends to the lever and the supporting frame, is yieldingly held in contact with one of a pair of cams 137 that are fast on shafts 138 and 238, respectively, journaled in bearings 139 on the main frame. The two cam shafts 138 and 238, which extend adjacent the transverse driven shaft 115 previously referred to, are provided with bevel gears 140 in mesh with similar gears 141 fast on the shaft 115. (See Figs. 1, 2 and 8.) The gearing is such as to rotate the shafts 138 and 238 in opposite directions and in timed relation to the feed chain 96, and the relative contours and settings of the cams 137 are such that the levers 134 and 234 are rocked at intervals in a manner to reciprocate the plungers 124 and 125 in timed relation to each other. That is to say, when the lower plunger 124 is at the end of its forward or effective stroke with the slotted end of the plunger projecting beyond the rearward edge of the table 121 and entered in the adjacent ends of the channels on the bed plate, as seen in Figs. 5 and 8, the upper plunger 125 is at the end of its rearward or idle stroke with its forward end withdrawn from such edge to permit the passage of a row of packages to and upon the table 121. Thereupon, the upper plunger 125 is moved forward, while the lower plunger 124 remains idle. The plunger 125 in its forward stroke, while the plunger 124 is still at rest, abuts the opposing ends of the packages and pushes the row from the table 121, as seen in Fig. 6, thus setting them with their major longitudinally extending portions resting upon the projections 126 of the lower plunger and with their lesser portions resting upon the proximate wall 132 of the channels. (See Fig. 10.) Thereupon, the upper plunger is moved rearward, and as it reaches the limit of the stroke the lower plunger is retracted, as seen in Fig. 5, so as to pull its projections 126 under the rearward edge of the table 121, thus withdrawing them from the row of packages partially supported by the projections. Consequently, since each consecutive pair of packages extend well over the underlying channel, the unsupported abutting sides of the packages gravitate into the channel, thus arranging the packages in vertical position, face to face, as seen in Figs. 12 and 13. This completes the operating cycle of the two plungers. In the next operation, as the lower plunger 124 moves forward to support the next succeeding row of packages, the preceding row seated in the channels is advanced along the channels by the end projections 126 of the plunger. Hence as each succeeding row of vertically disposed dual packages progresses toward the rear of the channels the packages are gradually brought nearer together by their sliding contact with the opposing converging walls of the channels, as seen in Fig.

13, and, therefore, the packages of each row when they are finally discharged are in close lateral relation and in convenient position for packing in cartons, one of which is indicated in dotted lines in Fig. 8.

It is to be understood that the invention is not limited to the particular exemplifying form thereof herein disclosed, as the mechanism may be modified within the principle of the invention and the scope of the appended claims.

I claim:

1. In combination with a support for a row of packages, means for successively advancing rows of packages upon said support, a rearwardly extending floor element below said support provided with a series of channels in angular relation to the path of delivery of said rows of packages, means including a movable element for endwise pushing the packages of each succeeding row from said support and positioning each package with one of its longitudinal marginal portions resting on the wall of a channel, means including an element movable in respect to said channels to support temporarily the adjacent edges of the respective pairs of packages, and means for actuating the said movable elements in timed relation, whereby when the second named element is moved in one direction the packages, unbalanced, overhang the adjacent channels, thus gravitating in pairs into the respective channels.

2. The combination with the conveyer of a packet assembling machine, said conveyer including a succession of holders for plural packets, and means for removing said packets from the conveyer and advancing them in succeeding rows, a support to and upon which the rows progress, a rearwardly extending floor element below said support provided with spaced longitudinal walls providing a series of channels in angular relation to the path of delivery of said rows of packets, upper and lower plungers mounted respectively for relative reciprocation upon and under said support, the upper plunger constructed to push said succeeding row from the support and over the said channels, and the lower plunger having comb-like projections movable into and from the said channels to support temporarily the adjacent edges of the respective pairs of packets, and means for reciprocating said plungers in timed relation, whereby when the lower plunger is withdrawn from the channels the packets, unbalanced, overhang the adjacent channels, thus gravitating in pairs into the respective channels.

WILMER C. NICODEMUS.